A. A. ANDERSON.
EGG HOLDER AND CUTTER.
APPLICATION FILED NOV. 2, 1909.
962,293.
Patented June 21, 1910.
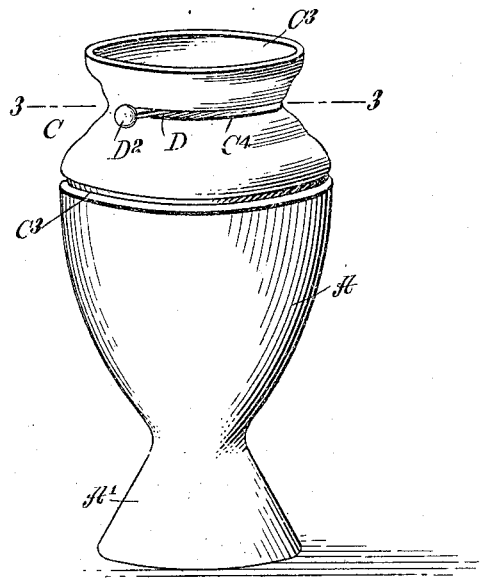
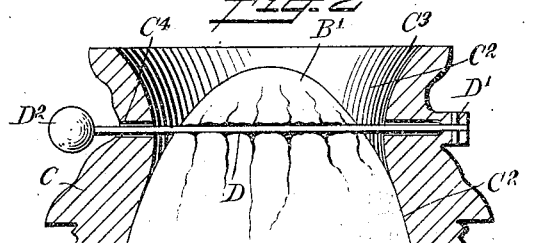
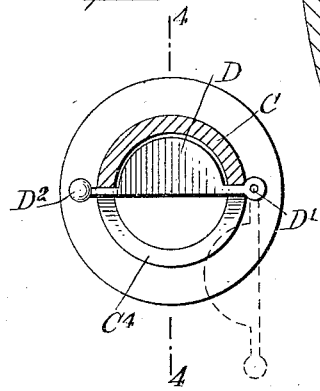
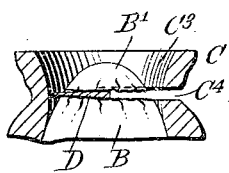
WITNESSES
E. G. Bromley,
Theo. G. Hoster
INVENTOR
Abraham Archibald Anderson
BY
Munn & Co
ATTORNEYS

UNITED STATES PATENT OFFICE.

ABRAHAM ARCHIBALD ANDERSON, OF NEW YORK, N. Y.

EGG HOLDER AND CUTTER.

962,293.   Specification of Letters Patent.   Patented June 21, 1910.

Application filed November 2, 1909. Serial No. 525,845.

*To all whom it may concern:*

Be it known that I, ABRAHAM ARCHIBALD ANDERSON, a citizen of the United States, and a resident of the city of New York, borough of Manhattan, in the county and State of New York, have invented a new and Improved Egg Holder and Cutter, of which the following is a full, clear, and exact description.

The object of the invention is to provide a new and improved egg holder, arranged to securely hold an egg in a vertical position, to permit of readily cutting the shell near the top thereof without spilling the contents of the shell or soiling the fingers of the operator, and to allow convenient adjustment for accommodating eggs of different sizes.

For the purpose mentioned, use is made of a cup having a vertically adjustable head provided with a cutting device.

A practical embodiment of the invention is represented in the accompanying drawings forming a part of this specification, in which similar characters of reference indicate corresponding parts in all the views.

Figure 1 is a perspective view of the egg holder; Fig. 2 is an enlarged sectional side elevation of the same; Fig. 3 is a sectional plan view of the same on the line 3—3 of Fig. 1; and Fig. 4 is a cross section of the top of the head piece, the remainder being broken away, taken on the line 4—4 of Fig. 3.

The cup A for receiving an egg B in a vertical position, as indicated in Fig. 2, is provided with a suitable base A' for supporting the egg holder on the table or the like. The mouth of the cup A is provided with an internal screw thread $A^2$, on which screws the lower threaded portion C' of a head C, having a central opening $C^2$ adapted to receive the upper portion of the egg B, as shown in Fig. 2, the opening $C^2$ terminating in a flaring mouth $C^3$ to give convenient access to the contents of the egg B after the top is cut off, as hereinafter more fully described.

In order to cut off the top B' of the egg B, use is made of a knife D having a semicircular cutting edge (see Fig. 3) and pivoted at D' on one side of the head C, the knife D passing through a slot $C^4$ in one side of the head C, to cut off the top B' of the egg B, as will be readily understood by reference to Figs. 2, 3 and 4. The free end of the knife D is provided with a suitable handle $D^2$, arranged outside of the head C, to permit the operator to conveniently impart a swinging motion to the knife D, for cutting off the top B' and for moving the knife out of the opening $C^2$ after the top B' is cut off, thus giving access to the contents of the egg.

By screwing the head C in the mouth $A^2$, it is evident that eggs B of different sizes can be readily held in position in the cup A by the head C, it being understood that the opening $C^2$ is flaring in the lower portion to fit the wall of the opening snugly onto the exterior surface of the egg B, to securely hold or clamp the egg in place in the cup A.

By the arrangement described, the knife D will always be in proper relation relatively to the portion B' to be cut off at the upper end of the egg with a view to gain access to the contents of the egg.

The egg holder shown and described is very simple and durable in construction, and is composed of comparatively few parts, which can be readily kept clean or in sanitary condition.

The cup A and the head C may be made of metal, porcelain or other suitable material.

Having thus described my invention, I claim as new and desire to secure by Letters Patent:

1. An egg holder, comprising a cup for the reception of the egg in a vertical position, a head screwing on the said cup and having a central opening into which is adapted to pass the upper end of the egg, and a lateral cutting device on the said head and adapted to pass into the said opening to cut off the top of the egg.

2. An egg holder, comprising a cup having an internal screw thread at the mouth of the cup, a head having a transverse slot leading to a central opening for engagement with the upper portion of the egg seated in the said cup, the head having a threaded lower portion screwing on the said screw thread in the mouth of the cup, and a horizontally-disposed knife fulcrumed on the said head and adapted to pass through the said slot into the said central opening to cut off the top of the egg.

In testimony whereof I have signed my name to this specification in the presence of two subscribing witnesses.

ABRAHAM ARCHIBALD ANDERSON.

Witnesses:
JAMES C. MILLER,
ALFRED J. O'KEEFFE, Jr.